United States Patent [19]

VanMatre

[11] Patent Number: 5,156,518

[45] Date of Patent: Oct. 20, 1992

[54] TRUCK BED UNLOADING DEVICE

[75] Inventor: Leroy VanMatre, South Bend, Ind.

[73] Assignee: Michael E. Wood, Mishawaka, Ind.

[21] Appl. No.: 658,520

[22] Filed: Feb. 21, 1991

[51] Int. Cl.$^5$ ................................................. B60P 1/36
[52] U.S. Cl. ..................................... 414/527; 414/507; 414/509
[58] Field of Search ............... 414/507, 509, 527, 679, 414/510, 539

[56] References Cited

U.S. PATENT DOCUMENTS

| | | | |
|---|---|---|---|
| 2,298,747 | 10/1942 | Agar | 414/509 |
| 2,355,226 | 8/1944 | Mallory | 414/527 |
| 2,876,917 | 3/1959 | King | 414/539 |
| 3,443,703 | 5/1969 | Matsumoto | 414/510 X |
| 3,978,996 | 9/1976 | Oltrogge | 414/527 X |
| 4,277,220 | 7/1981 | Wiley | 414/539 |
| 4,339,884 | 7/1982 | Andrews | 414/527 X |
| 4,601,631 | 7/1986 | Van Raaij | 414/527 X |
| 4,842,471 | 6/1989 | Hodgetts | 414/527 X |

FOREIGN PATENT DOCUMENTS 54-18520  2/1979  Japan .................... 414/539

Primary Examiner—Robert J. Spar
Assistant Examiner—Robert S. Katz
Attorney, Agent, or Firm—John J. Gaydos

[57] ABSTRACT

An unloading device having a frame transversely supportable on a pair of spaced side walls of a truck bed is longitudinally movable from the front to the rear of the truck bed. A plurality of wheels secured to the frame and engagable with the side walls facilitate movement of the device. An electric motor or hand crank is drivingly connected to a main shaft mounted on the frame for rotating the shaft in opposite directions, and an elongated sheet of material, such as reinforced nylon, having one end thereof secured to the shaft and the other end thereof secured to the rear of the truck bed is used for receiving an article for transportation. Rotation of the shaft in one direction winds the sheet of material on the shaft, moves the frame toward the rear of the truck bed and shifts the article on the sheet from the front of the truck bed to the rear and off of the truck bed. A rail is mounted on each of the side walls of the truck bed for guiding the wheels.

7 Claims, 2 Drawing Sheets

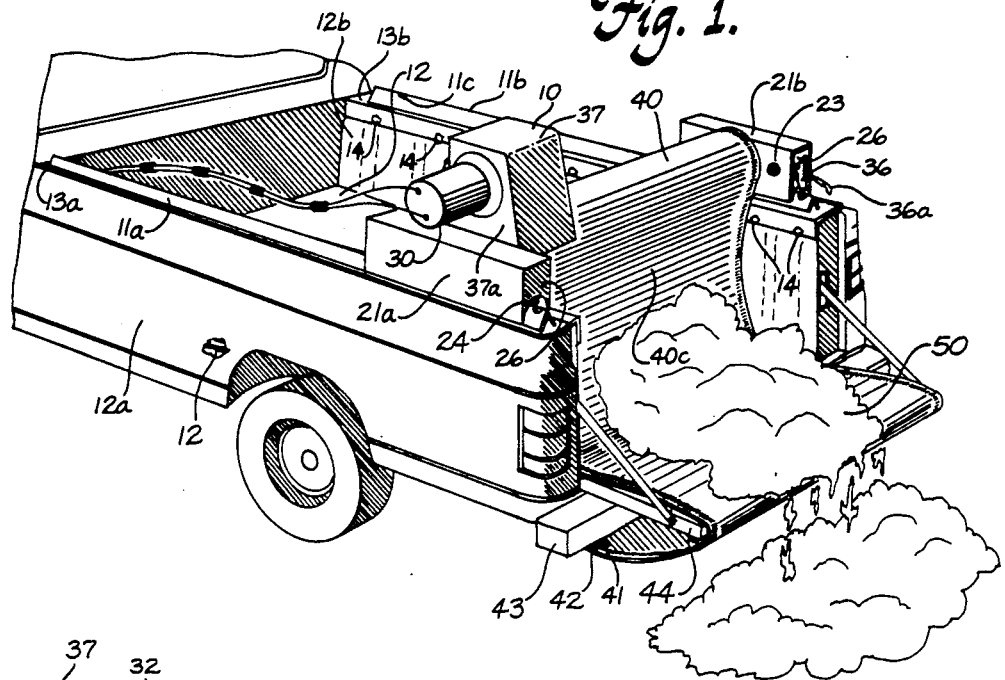
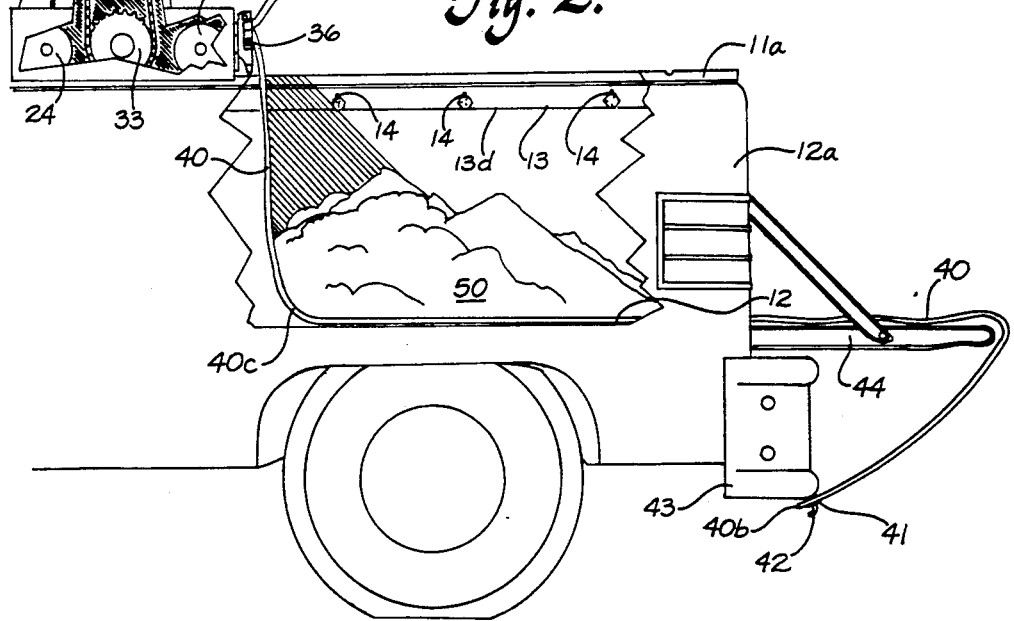

TRUCK BED UNLOADING DEVICE

BACKGROUND OF THE INVENTION

The present invention relates to an unloading devise for a truck bed and, more particularly, to an improved unloading device for transporting and dumping an article from the truck bed.

Generally, truck unloading devices are fixedly secured to the frame of a truck or to the body of a truck bed and a number of advantages are associated with such prior art devices. For instance, a substantial increase in efficiency is realized because the prior art devices employing a movable belt or a sheet are fixedly secured to or fixedly mounted on the truck and, when the truck is always used for the same purpose, it is not necessary to remove the unloading device from the truck. In addition, the weight and complexity of the prior art unloading devices make it difficult for a person to attach or remove quickly the unloading device to or from the truck bed. Recently, the present trend is toward utilizing small trucks, commonly referred to as pickup trucks, not only for transporting articles, parts and the like, but also for transporting people from one location to another. It would, therefore, be desirable to employ an unloading device for a truck that can be readily attached to the truck by one person when it is necessary to transport articles and then quickly removed from the truck.

Accordingly, it is an object of the present invention to provide a new and improved truck bed unloading device.

Another object of the present invention is to provide a new and improved truck bed unloading device which obviates the above-described disadvantages of the prior art devices.

A further object of the present invention is to provide a new and improved truck bed unloading device that can be readily attached to and quickly removed from a truck in a simple and facile manner.

Still another object of the present invention is to provide a new and improved truck bed unloading device that can be made in various sizes to accommodate the width and length of a truck bed.

An additional object of the present invention is to provide a new and improved truck bed unloading device movable on a truck bed and having a sheet of material that can be efficiently and quickly attached to or removed from a truck bed.

A still further object of the present invention is to provide a new and improved truck bed unloader device having a sheet of material that can be readily unwound and placed on a truck bed for transporting an article from the truck bed and then wound on a shaft to permit removal of the device for storage in a garage, shed or the like.

The invention further resides in various structural improvements and innovations in the truck bed unloading device by virtue of efficiency and simplicity of operation combined with sturdiness of operation, of which the structural features may be particularly mentioned in the novel manner in which the truck bed unloading device is movably supported on the truck bed, can readily be removed and stored, and the low manufacturing cost thereof.

Additional objects and advantages will be apparent to one skilled in the art and still other advantages will become apparent hereinafter.

SUMMARY OF THE INVENTION

In summary, to accomplish the foregoing and other objects of the present invention, there is provided a truck bed unloading device generally movably supportable on a pair of spaced rails mounted on opposite sides of a truck bed and comprising a frame transversely supported on the spaced rails and movable from the front end of the truck bed to the rear end thereof on the pair of spaced rails. A prime mover, e.g., an electric motor is connected to a shaft supported by the frame for rotating the shaft in opposite directions. An elongated sheet of material, such as reinforced nylon, has one end secured to the shaft and the other end secured to the rear of the truck or truck bed is used for receiving an article for transportation. Operation of the device is obtained by energizing the prime mover, e.g., the electric motor, and rotating the shaft in one direction causing the sheet of material to wind slowly on the shaft and moving the device rearwardly on the rails and transporting an article placed on the sheet of material from the front end of the truck bed to and over the rear end of the truck bed. After the article has been dumped from the sheet of material behind the rear end of the truck bed, the prime mover is then energized for unwinding the sheet of material and the unloading device is moved toward the front end of the truck bed. In the alternative, the sheet of material can be disconnected from the rear end of the truck bed, wound on the shaft, and the device can be moved to the front end of the truck bed or removed from the truck bed and placed in storage.

DESCRIPTION OF THE DRAWINGS

For a better understanding of the present invention, reference may be had to the accompanying drawings in which all of the parts are numbered, the same numbers being used to refer to corresponding parts throughout, and wherein:

FIG. 1 is an isometric view of the truck bed unloading device mounted on a truck;

FIG. 2 is a side elevational view of the truck bed unloading device of FIG. 1, with a portion of the sidewall of the truck removed;

DETAILED DESCRIPTION OF THE INVENTION

Figure 3:
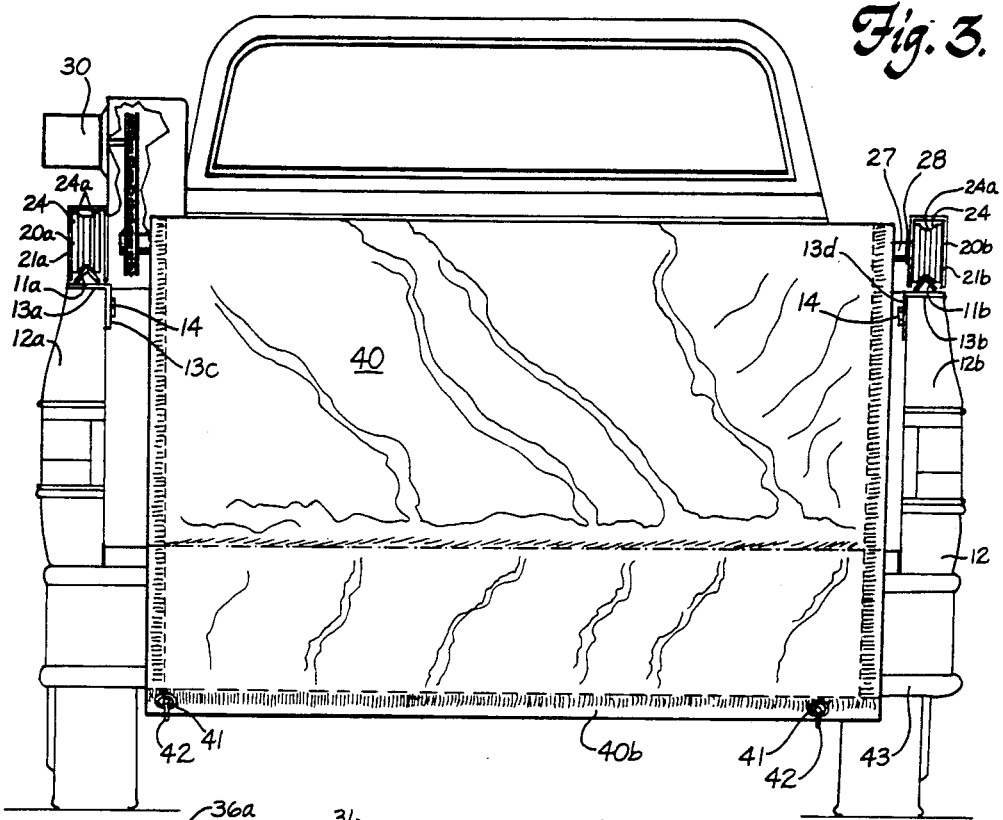
FIG. 3 is a rear elevational view of the truck bed unloading device of FIG. 1, assuming that the truck of FIG. 1 is shown in full.
Figure 4:
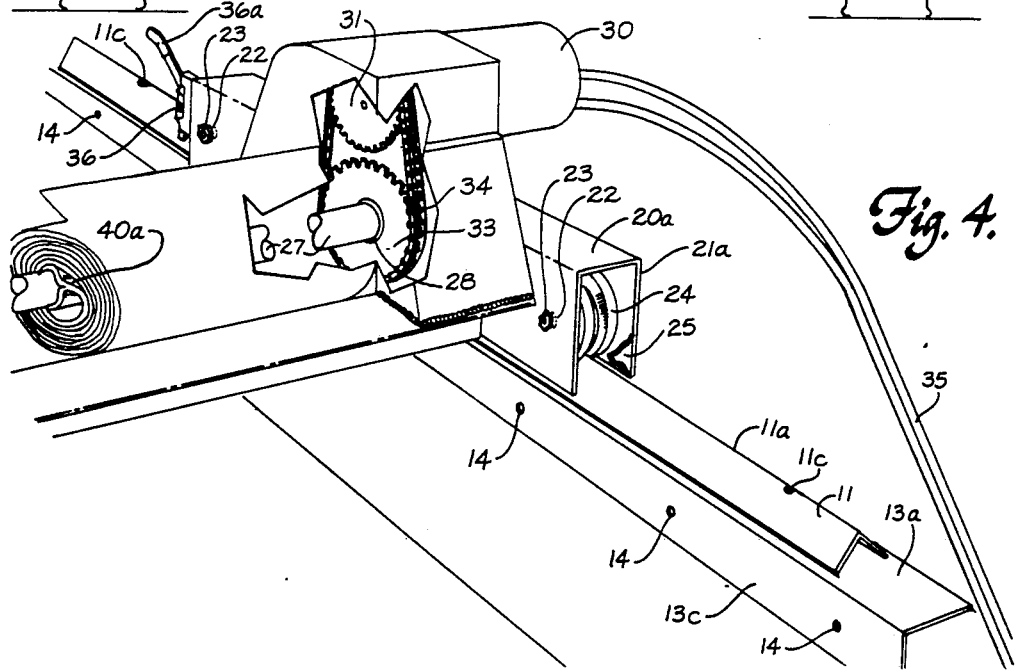
FIG. 4 is a front elevational view of a portion of the truck bed unloading device of FIG. 1, located in the center of the truck bed.

Referring now to the drawings, there is illustrated a truck bed unloading device, generally indicated at 10, supported on a pair of guide rails 11a, 11b mounted on opposite sides of the side walls 12a, 12b of a truck bed 12 as best shown in FIGS. 1 and 4 of the drawings. Each of the spaced guide rails 11a, 11b is preferably made from a suitable section of angle iron 11 readily available on the market. For the purpose of providing a supporting surface 13a, 13b for the spaced guide rails 11a, 11b, a section of angle iron 13 of suitable width is secured against the top surface of each of the side walls 12a, 12b of the truck bed 12 as best shown in FIGS. 1 and 4 of the drawings. A plurality of suitable fasteners 14, such as bolts and nuts, are employed for securing the vertical side portions 13c, 13d of each angle iron 13 to each of the side walls 12a, 12b of the truck bed 12. The guide rails 11a, 11b supported on the horizontal surfaces 13a, 13b of each angle iron 13 are provided with a plurality of recessed openings 11c containing bolts fixedly securing the guide rails 11a, 11b to the top surfaces 13a, 13b of angle iron 13. It is to be understood that the unloading device 10 can be supported directly on the side walls 12a, 12b of the truck bed 12.

In accord with the present invention, the truck bed unloading device 10 comprises a pair of spaced frame members 20a, 20b mountable on the guide rails 11a, 11b. Each of the frame members 20a, 20b includes a U-shaped housing bracket 21a, 21b and each of the legs of the brackets is provided with openings 22 (See FIG. 4 of the drawings) for receiving stub shafts 23. As best seen in FIG. 1 of the drawings, each of the stub shafts 23 rotatably supports a wheel 24 provided with a peripherally inwardly extending V-groove 24a similar to the angle of the guide rails 11a, 11b. Suitable not shown bearings are provided in the hub of each wheel 24 to facilitate rotation of the wheels 24 on each of the respective guide rails 11a, 11b. Front and rear covers 25, 26 are secured to the housing brackets 21a, 21b for enclosing the wheels in the frame members 20a, 20b. Preferably and as illustrated in the drawings, a main shaft 27 is rotatedly supported by the spaced U-shaped housing brackets 21a, 21b and a main bearing 28 is fixedly secured to the inner wall of each the brackets for rotatedly supporting the main shaft 27.

For the purpose of rotating the shaft 27, a prime mover 30, for example an electric motor, is drivingly connected to the main shaft 27 by means of a first sprocket 31 fixedly secured to the output shaft 32 of the motor 30, a second sprocket 33 fixedly secured to the main shaft 27, and an endless chain belt 34 interconnecting the two sprockets. The electric motor 30 generally is of the d-c type operating on twelve volts d-c, and is interconnected with a pair of wires 35 to a not shown twelve volt battery mounted in the front portion of the truck. Operation is effected by energizing the electric motor 30 with a switch 36 suitably secured to one of the rear covers 26 of the U-shaped housing bracket 21b. The switch 36 is electrically connected to the motor 30 for driving and switching rotation of the output shaft 32 in either direction. A handle 36a extending from the switch 36 is employed for operating the switch 36. Specifically, when the handle 36a is in the upward position, the motor 30 is energized to rotate the shaft in one direction and when the handle 36a is in the downward position, the motor 30 is energized to rotate the shaft in the opposite direction. The switch is in "off" when the handle is in the center position. A housing 37 encloses the sprockets 31, 38 and the endless chain belt 34. The electric motor 30 is secured to the outer side wall 37a of the housing 37. It is to be understood that the main shaft 27 can extend through one of the outer walls of the U-shaped housing brackets and the output shaft 32 of the motor 30 can be directly coupled to the main shaft 27.

Preferably and in accord with the present invention, a sheet of material 40 of reinforced nylon or other suitable material is employed for supporting an article 50 for transportation. As best shown in FIG. 4 of the drawings, one end 40a of the sheet of material 40 is fixedly secured to the main shaft 27 with screws and the other end 40b is provided with a pair of eyelets 41 securable to hooks 42 connected to the rear end of the truck bed or the equivalent, e.g., the rear bumper 43 of the truck.

After the article 50 has been placed on the sheet of material 40 as best shown in FIG. 2 of the drawings, and transported, and is ready for delivery at a particular location, the rear gate 44 of the truck bed is opened and the end 40b of the sheet of material 40 with the eyelets 41 is secured to the hooks 42 extending from the bumper 43. Upon energizing the motor 30, i.e., by lifting the handle 36a of the electrical switch 36 upwardly, the motor rotates in the direction for winding the sheet of material 40 on the main shaft 27. As the sheet of material 40 is slowly rolled on the shaft 27, the article 50 is moved toward the rear of the truck bed. Simultaneously during operation of the motor 30, the truck bed unloading device 10 moves rearwardly toward the rear end of the truck bed on the guide rails 11a, 11b until the article 50 supported by the sheet of material 40 is dumped from the truck bed. Depending upon the type of article on the sheet of material 40, the motor 30 can be energized for rotating the shaft 27 until the center portion 40c of the sheet of material 40 is disposed at an angle to the horizontal for assuring that the entire article is dumped from the truck bed. After the article has been dumped from the truck bed, the rear portion of the sheet of material 40 containing the eyelets 41 is disconnected from the hooks 42 and, upon further energization of the electric motor 30 and rotation of the main shaft 27, the sheet of material can be wound onto the shaft 27. The unloading device can then be readily moved toward the front end of the truck bed or the unloading device 10, in accord with the present invention, can be lifted from the guide rails and placed in a suitable facility for storage.

Inasmuch as the loading device is merely supported on the guide rails by means of the V-groove wheels 34, the device 10 can be readily mounted on the truck bed or removed from the truck bed merely by disconnecting the wires 35 connecting the electric motor to the battery. It is to be also understood that instead of a motor, a not shown crank can be employed for manually rotating the main shaft 27 in either direction. It is to be further understood that the guide rails 11a, 11b and the right angle iron 13 can be fixedly secured to the side walls of the truck bed and it is not necessary to remove such rails when the unloading device is placed into storage. Further, instead of the guide rails 13a, 13b, a pair of elongated pipes or tubes can be secured to the angle iron 13 on to the side walls of the truck bed also referred to as a cargo box of the truck.

It will be apparent to one skilled in the art that the present invention may be embodied in other specific forms without departing from the spirit or essential attributes thereof. It is, therefore, desired and intended that the several embodiments herein specifically set forth be considered in all respects as illustrative and not restrictive, reference being made to the appended claims rather than the foregoing description and drawings to indicate the scope of the invention, which is to be understood as limited only by the scope of the appended claims.

I claim:

1. An unloading device for a truck bed comprising a frame member transversely supportable on the truck bed, the truck bed having a floor and a pair of spaced vertical sidewalls and having a front end and a rear end, the frame member being movable longitudinally along an upper portion of the sidewalls between the ends of the truck bed, a main shaft rotatably supported by the frame member and movable therewith on the truck bed, drive means connected to the main shaft for rotating the main shaft in opposite directions, and an elongated sheet of material having one end thereof secured to the main shaft and the other end thereof securable to the rear end of the truck bed, the length of the sheet of material being greater than the length from the front end to the rear end of the truck bed, the center portion of the sheet of material resting on the floor of the truck bed for receiving a transportable article whereby upon rotating the main shaft in one direction, the sheet of material is wound onto the main shaft for transporting the article deposited on the sheet of material from the front end of the truck bed to the rear end of the truck bed.

2. The unloading device of claim 1, comprising a guide rail securable to each of the pair of spaced vertical side walls of the truck bed, the frame member being supported on the guide rails.

3. The unloading device of claim 1, wherein the drive means comprises an electric motor energizable for rotation in opposite directions for winding and unwinding the sheet of material secured to the main shaft.

4. The unloading device of claim 1, wherein the frame member comprises a plurality of wheels mounted for free rotation and engagable with the truck bed for longitudinal movement of the frame member.

5. The unloading device of claim 2, wherein the frame member comprises a plurality of wheels engagable with the guide rails.

6. The unloading device of claim 5, wherein each of the wheels is provided with an inwardly extending V-shaped peripheral groove, and each of the guide rails has a pair of downwardly extending angular sides.

7. The unloading device of claim 3, wherein the electric motor is provided with an output shaft, and the drive means further comprises a first sprocket secured to the output shaft, a second sprocket secured to the main shaft, and an endless chain belt interconnecting the two sprockets for rotating the main shaft when the motor is energized.

* * * * *